United States Patent
Seino et al.

(10) Patent No.: US 12,155,076 B2
(45) Date of Patent: Nov. 26, 2024

(54) SECONDARY BATTERY

(71) Applicant: SAMSUNG SDI CO., LTD., Yongin-si (KR)

(72) Inventors: Hiroshi Seino, Yongin-si (KR); Jae Hyuck Cha, Yongin-si (KR); Jeong Chull Ahn, Yongin-si (KR); Sang Hyun Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 17/470,117

(22) Filed: Sep. 9, 2021

(65) Prior Publication Data

US 2022/0094001 A1  Mar. 24, 2022

(30) Foreign Application Priority Data

Sep. 22, 2020 (KR) .................. 10-2020-0122512

(51) Int. Cl.
*H01M 50/186* (2021.01)
*H01M 50/547* (2021.01)
*H01M 50/557* (2021.01)

(52) U.S. Cl.
CPC ....... *H01M 50/186* (2021.01); *H01M 50/547* (2021.01); *H01M 50/557* (2021.01)

(58) Field of Classification Search
CPC . H01M 50/186; H01M 50/547; H01M 50/557
USPC ......................................................... 429/179
See application file for complete search history.

(56) References Cited

U.S. PATENT DOCUMENTS

| 9,406,922 | B2 | 8/2016 | Ryu et al. |
| 2014/0011060 | A1* | 1/2014 | Yang ..................... H01M 50/55 29/623.2 |
| 2014/0199581 | A1 | 7/2014 | Ryu et al. |

FOREIGN PATENT DOCUMENTS

| KR | 100824807 B1 * | 4/2008 |
| KR | 10-1547403 B1 | 8/2015 |
| KR | 10-2017-0096743 A | 8/2017 |

(Continued)

OTHER PUBLICATIONS

KR-20140091441-A (machine translation) (Year: 2014).*
KR100824807B1 (machine translation) (Year: 2008).*

*Primary Examiner* — Matthew T Martin
*Assistant Examiner* — Paul Christian St Wyrough
(74) *Attorney, Agent, or Firm* — Lee IP Law, P.C.

(57) ABSTRACT

A secondary battery including an electrode assembly including a negative electrode plate having a negative electrode tab, a positive electrode plate having a positive electrode tab, and a separator between the negative electrode plate and the positive electrode plate; a pouch accommodating the electrode assembly, the pouch having a sealing portion at an edge thereof that is sealed with the electrode assembly accommodated in the pouch; and a strip terminal, including a negative electrode lead electrically connected to the negative electrode tab, a positive electrode lead electrically connected to the positive electrode tab, and a tab film having one end coupled to the negative electrode lead and another end coupled to the positive electrode lead, the tab film insulating the negative electrode lead, the positive electrode lead, and the pouch from one another and including a through-hole passing therethrough between the one end and the other end.

9 Claims, 7 Drawing Sheets

(56) References Cited

FOREIGN PATENT DOCUMENTS

KR 10-1769106 B1 8/2017

\* cited by examiner

FIG. 10

| No. | Punching type | Strip terminal shape | Punching area | Breaking conditions during thermal exposure tests | |
|---|---|---|---|---|---|
| | | | | Breaking temperature/°C | Breaking pressure/mbar |
| 0 | Separation type | | None (W4mm*L12mm) | 132.3 | 385 |
| 1 | Integration type | | None | 131.8 | 246 |
| 2 | Middle punching | | W3mm*L12mm | 132.8 | 392 |
| 3 | Bottom punching | | W4mm*L12mm | 132.7 | 396 |
| 4 | Ladder type punching | | Size of each punching portion W3mm*L2mm*5ea Punching distance: 0.5 mm | 132.4 | 342 |

SECONDARY BATTERY

CROSS-REFERENCE TO RELATED APPLICATION

This application claims priority to and the benefit of Korean Patent Application No. 10-2020-0122512 filed on Sep. 22, 2020 in the Korean Intellectual Property Office, the contents of which in its entirety are herein incorporated by reference.

BACKGROUND

1. Field

Embodiments relate to a secondary battery.

2. Description of the Related Art

A secondary battery may include an electrode assembly including a positive electrode, a negative electrode, and a separator between the positive electrode and the negative electrode, and a case for accommodating the electrode assembly together with an electrolyte.

The electrode assembly may be formed in a structure in which a plurality of electrodes are stacked or in the form of a roll wound in one direction, e.g., a jelly roll. The case may be in the form of a pouch or pocket, and may include a thermally fusible resin layer. The case may be sealed by pasting the thermally fusible resin layer in a state in which the jelly roll is accommodated therein.

SUMMARY

The embodiments may be realized by providing a secondary battery including an electrode assembly including a negative electrode plate having a negative electrode tab, a positive electrode plate having a positive electrode tab, and a separator between the negative electrode plate and the positive electrode plate; a pouch accommodating the electrode assembly, the pouch having a sealing portion at an edge thereof that is sealed with the electrode assembly accommodated in the pouch; and a strip terminal, including a negative electrode lead electrically connected to the negative electrode tab, a positive electrode lead electrically connected to the positive electrode tab, and a tab film having one end coupled to the negative electrode lead and another end coupled to the positive electrode lead, the tab film insulating the negative electrode lead, the positive electrode lead, and the pouch from one another and including a through-hole passing therethrough between the one end and the other end.

A portion of the sealing portion may overlie the through-hole of the tab film.

The portion of the sealing portion may be aligned along a longitudinal direction of the tab film.

The tab film may be in the form of two sheets, which are attached to each other with the negative electrode lead and the positive electrode lead therebetween.

The tab film may have a rectangular shape, the tab film may include tab support portions coupled to the negative electrode lead and the positive electrode lead, and a tab connection portion connecting the tab support portions, and the through-hole may be in the tab connection portion.

The through-hole may include at least one through-hole extending along a longitudinal direction of the tab film, and may have a circular shape, an oval shape, a polygonal shape, a straight shape, a curved shape, or a dotted line shape.

The embodiments may be realized by providing a secondary battery including an electrode assembly including a negative electrode plate having a negative electrode tab, a positive electrode plate having a positive electrode tab, and a separator between the negative electrode plate and the positive electrode plate; a pouch accommodating the electrode assembly, the pouch having a sealing portion at an edge thereof and sealed in a state in which the electrode assembly is accommodated therein; and a strip terminal, including a negative electrode lead electrically connected to the negative electrode tab, a positive electrode lead electrically connected to the positive electrode tab, tab support portions coupled to the negative electrode lead and the positive electrode lead, and a tab connection portion connecting the tab support portions, the tab connection portion including a tab film having a through-hole passing through a partial area of the tab connection portion, wherein the through-hole of the tab film is on the sealing portion of the pouch.

A portion of the sealing portion may overlie the through-hole of the tab film.

The tab film may be in the form of two sheets, which are attached to each other with the negative electrode lead and the positive electrode lead therebetween.

The through-hole may include at least one through-hole extending along a longitudinal direction of the tab film, and may have a circular shape, an oval shape, a polygonal shape, a straight shape, a curved shape, or a dotted line shape.

BRIEF DESCRIPTION OF DRAWINGS

Features will be apparent to those of skill in the art by describing in detail exemplary embodiments with reference to the attached drawings in which:

FIG. 10 shows a table comparing breaking conditions during thermal exposure tests in the sealing structure of a general secondary battery and the sealing structure of a secondary battery according to embodiments of the present disclosure.

DETAILED DESCRIPTION

Figure 1:
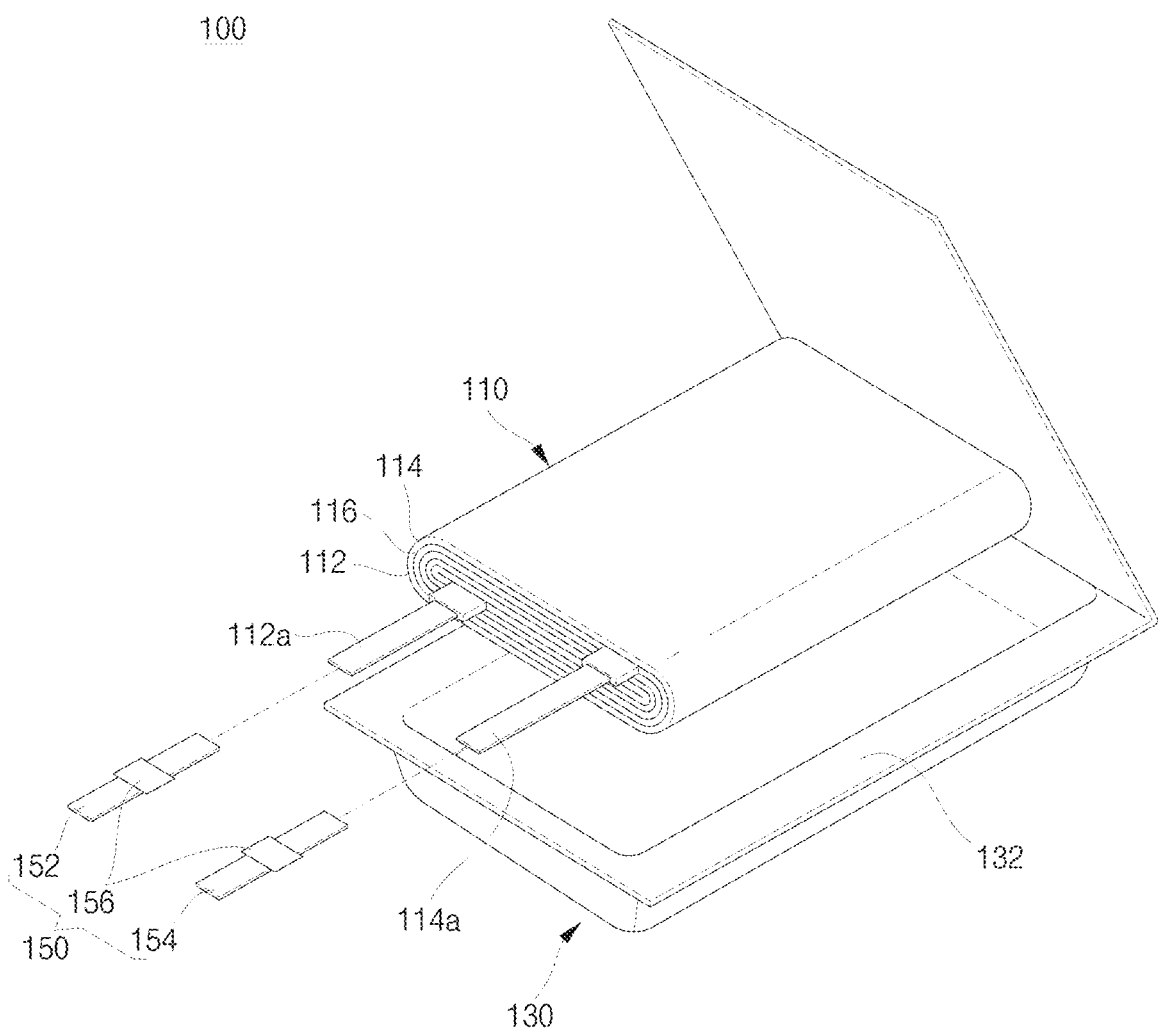
FIG. 1 is a partial perspective view showing the structure of a secondary battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

In addition, in the accompanying drawings, sizes or thicknesses of various components are exaggerated for brevity and clarity. Like numbers refer to like elements throughout. As used herein, the terms "or" and "and/or" include any and all combinations of one or more of the associated listed items, e.g., "A or B" would include A, B, or A and B. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" or "include" and/or variations thereof, when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms, and do not imply or require sequential inclusion. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Hereinafter, the structure of a (e.g., polymer) secondary battery will be briefly described.

Figure 2:
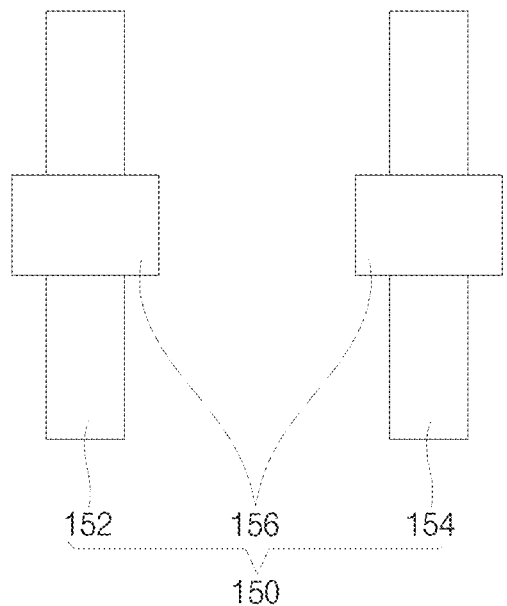
FIG. 2 is a schematic diagram illustrating a separation type sealing structure of a strip terminal shown in FIG. 1.
Figure 3:
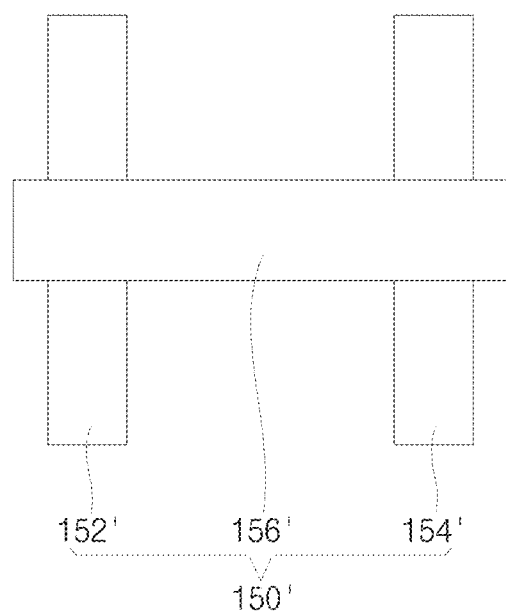
FIG. 3 is a schematic view showing an integrated sealing structure of a strip terminal shown in FIG. 1.

FIG. 1 is a partial perspective view showing the structure of a secondary battery. FIG. 2 is a schematic diagram illustrating a separation type sealing structure of a strip terminal shown in FIG. 1. FIG. 3 is a schematic view showing an integrated sealing structure of a strip terminal shown in FIG. 1.

As shown in FIG. 1, a secondary battery 100 may include an electrode assembly 110 and a pouch 130 accommodating the electrode assembly 110.

The electrode assembly 110 may include a negative electrode plate 112 as a first electrode plate, a positive electrode plate 114 as a second electrode plate, and a separator 116 therebetween. The negative electrode plate 112 may include a negative electrode tab 112a electrically connected to a negative electrode uncoated region, and the positive electrode plate 114 may include a positive electrode tab 114a electrically connected to a positive electrode uncoated region. The negative electrode tab 112a and the positive electrode tab 114a may be welded to a negative electrode lead 152 and a positive electrode lead 154 of an external terminal to be electrically connected to an exterior side. A tab film 156 (for insulation from the pouch 130) may be attached to the negative electrode lead 152 and the positive electrode lead 154.

In a state in which the electrode assembly 110 is accommodated in the pouch 130 (e.g., in a fully assembled battery), the pouch 130 may be sealed such that sealing portions 132 at the edges thereof come into contact with each other. Here, sealing may be accomplished in a state in which the tab film 156 is between the sealing portions 132. As shown in FIG. 2, the type of the tab film 156, in which the tab film 156 is (e.g., separately) attached to each of the negative electrode tab 112a and the positive electrode tab 114a, is defined as a "separation type tab film" (this sealing structure is defined as a separation type sealing structure).

The sealing portions 132 of the pouch 130 may be made of a thermally fusible material, and may be configured such that thermally fusible layers are adhered to each other to then be sealed. The thermally fusible material may be weak in view of adhesion to metal, and the tab film 156 (in the form of a thin film) may be fused with the pouch 130 by attaching same to the tab. In the separation type sealing structure, the tab film 156 may be separately attached to each tab, welded thereto, and then thermally fused again with the pouch 130, and thus workability and productivity may be undesirably lowered.

As shown in FIG. 3, a method has been developed, in which the negative electrode tab 112a and the positive electrode tab 114a are (e.g., physically) connected to each other by an integrated tab film 156' and then thermally fused with the pouch 130 (hereinafter to be defined as an "integrated tab film", and this sealing structure is defined as an integrated sealing structure). In the integrated sealing structure shown in FIG. 3, although the workability and productivity thereof may be improved, a thickness of the tab film 156' may be thicker than that of the separation type sealing structure. In addition, in the tab film 156' made of a resin, an amount of moisture permeation may be proportional to the area of the tab film 156', and thus the amount of moisture permeation may also increase as the area of the tab film 156' increases, thereby reducing the reliability of the secondary battery 100.

According to an embodiment, a sealing structure may address the above-described issues while maintaining the advantages of both the separation type sealing structure and the integrated sealing structure.

Hereinafter, a secondary battery according to an embodiment of the present disclosure will be described in detail with reference to the accompanying drawings.

Figure 4:
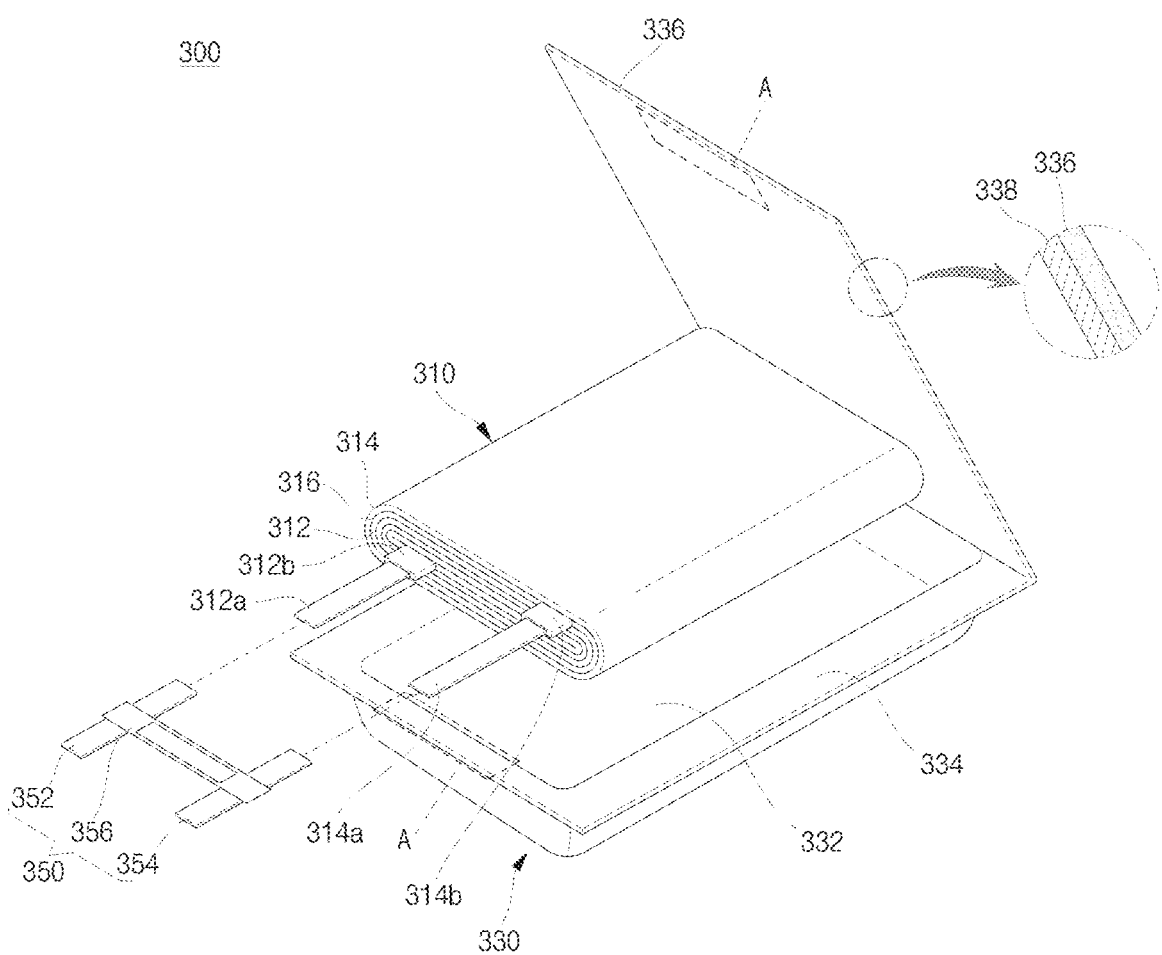
FIG. 4 is a partial perspective view showing the structure of a secondary battery according to an embodiment of the present disclosure.
Figure 5:
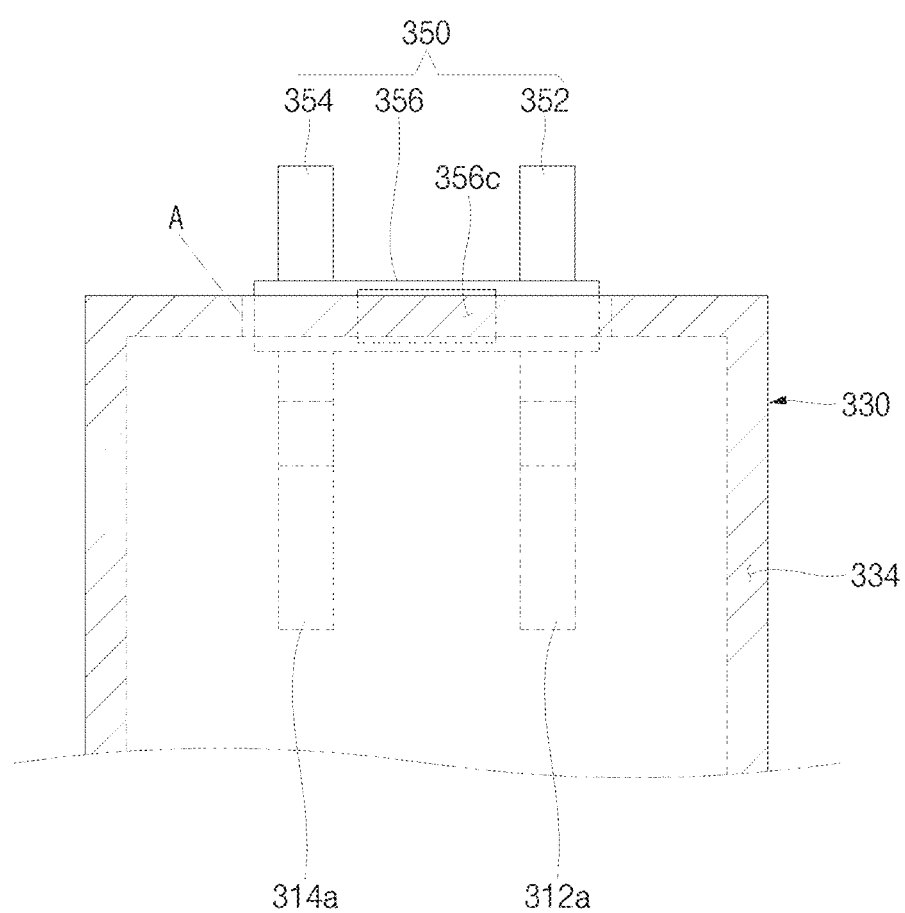
FIG. 5 is a plan view illustrating a sealing portion according to an embodiment of the present disclosure.

FIG. 4 is a partial perspective view showing the structure of a secondary battery according to an embodiment of the present disclosure. FIG. 5 is a plan view illustrating a sealing portion according to an embodiment of the present disclosure.

As shown in FIGS. 4 and 5, a secondary battery 300 according to an embodiment of the present disclosure may include an electrode assembly 310, a pouch 330 accommodating the electrode assembly 310, and a strip terminal 350 for connecting an electrode assembly 310 to an exterior side.

As shown in FIG. 4, the electrode assembly 310 may include a negative electrode plate 312, a positive electrode plate 314, and a separator 316 between the negative electrode plate 312 and the positive electrode plate 314. In an implementation, the electrode assembly 310 may be of a stack type in which a stack of the negative electrode plate 312, the separator 316, and the positive electrode plate 314, is repeatedly stacked a plurality of times. In an implementation, the electrode assembly 310 may be of a roll type in which a stack of the negative electrode plate, the separator 316, and the positive electrode plate 314, is wound. The electrode assembly 310 may be referred to as a jelly roll. In the present disclosure, an example in which the electrode assembly 310 is wound will now be described.

The negative electrode plate 312 may be formed by coating a negative electrode active material on both sides of a negative electrode current collector plate made of, e.g., a metal foil such as copper, a copper alloy, nickel, or a nickel alloy. The negative active material may include, e.g., a carbon-based material, Si, Sn, tin oxide, tin alloy composite, transition metal oxide, lithium metal nitrite, or metal oxide. A negative electrode uncoated region (to which a negative electrode active material is not applied) may be formed in some regions of the negative electrode current collector. A negative electrode tab 312a may be provided on the negative electrode uncoated region to be electrically connected to the negative electrode uncoated region. An insulating member 312b may be attached to the negative electrode tab 312a to help prevent the negative electrode tab 312a from being shorted with the pouch 330.

The positive electrode plate 314 may be formed by coating a positive electrode active material on both surfaces of a positive electrode current collector made of, e.g., an aluminum metal foil having excellent conductivity. The positive electrode active material may include, e.g., a chalcogenide compound, and for example, composite metal oxides such as $LiCoO_2$, $LiMn_2O_4$, $LiNiO_2$, $LiNiMnO_2$, or the like may be used. A positive electrode uncoated region (to which a positive electrode active material is not applied) may be formed in some regions of the positive electrode current collector. A positive electrode tab 314a may be provided in the positive electrode uncoated region to be electrically connected to the positive electrode uncoated region. An insulating member 314b may be attached to the positive electrode tab 314a to help prevent the positive electrode tab 314a from being shorted with the pouch 330.

The separator 316 may be between the negative electrode plate 312 and the positive electrode plate 314 to help prevent a short circuit therebetween. The separator 316 may be made of, e.g., polyethylene, polypropylene, or a porous copolymer of polyethylene and polypropylene. The separator 316 may be larger than the negative electrode plate 312 and the positive electrode plate 314 in order to help prevent an electrical short between the negative electrode plate 312 and the positive electrode plate 314.

In the electrode assembly 310 having the above-described structure, the negative electrode tab 312a and the positive electrode tab 314a may protrude to or at one end along the winding axis direction, and the negative electrode lead 352 and the positive electrode lead 354 of the strip terminal 350 may be electrically connected to ends of the protruding negative electrode tab 312a and the positive electrode tab 314a, respectively, which will be described in greater detail below. In a state in which the strip terminal 350 is connected to the negative electrode tab 312a and the positive electrode tab 314a, the pouch 330 may be sealed and hermetically enclosed.

As shown in FIG. 4, the pouch 330 may be formed by folding a rectangular plate-shaped material having a predetermined size in half along a longitudinal direction. After the middle portion of the pouch 330 is folded, a recess 332 (for accommodating the electrode assembly 310) may be at one folded side, and the recess 332 may be covered by the other folded side (hereinafter, a cover portion), and sealing may be performed. Sides of the pouch 330 facing each other when folded may be defined as inner surfaces and the opposite sides as outer surfaces.

The recess 332 may have a size sufficient to accommodate the electrode assembly 310, and may be formed, e.g., through a press or drawing process. After the cover portion 336 covers the portion where the recess 332 is formed, the edge of the recess 332 and the edge of the cover portion 336 may be thermally fused to each other to seal the electrode assembly 310. For convenience, the edge of the recess 332 in close contact with the edge of the cover portion 336 is defined as the sealing portion 334. A thermally fusible layer 338 (made of a thermally fusible material) may be on the inner surfaces of the pouch 330 that are fused to each other.

The thermally fusible layer 338 may be made of a material having insulating and thermally adhesive properties, and may also be commonly referred to as a laminate exterior material. The thermally fusible layer 338 may be entirely on the inner surfaces of the pouch 330, or may be only on the inner surfaces of the sealing portion 334 and the cover portion 336. Sealing of the pouch 330 may be achieved by thermally fusing the sealing portion 334 and the cover portion 336 to each other, and at least the inner surfaces of the sealing portion 334 and the cover portion 336 may be the thermally fusible layer 338 on the sealing portion 334 and the inner surface of the cover portion 336. When the sealing portion 334 and the cover portion 336 come into contact with each other and thermally fused, the pouch 330 may be sealed in a state in which a tab film 356 of the strip terminal 350 is between the sealing portion 334 and the cover portion 336. The sealing portion of the pouch 330, which may be sealed with the tab film 356, may correspond to the sealing portion 334 and a portion of the cover portion 336 that comes into contact with the tab film 356.

As shown in FIGS. 4 and 5, the strip terminal 350 may be electrically connected to the negative electrode tab 312a and the positive electrode tab 314a to electrically connect the secondary battery 300 to an exterior side. The strip terminal 350 may include a negative electrode lead 352 and a positive electrode lead 354 welded to the negative electrode tab 312a and the positive electrode tab 314a, respectively, and a tab film 356 for insulating the negative electrode lead 352 and the positive electrode lead 354 from the pouch 330. The strip terminal 350 may be a kind of external terminal, and the negative electrode lead 352 and the positive electrode lead 354 may be thin-plate conductors and thus may be commonly referred to as strip terminals. The tab film 356 may help support the negative electrode lead 352 and the positive electrode lead 354 and may help increase insulation and adhesion to the pouch 330.

As shown in FIGS. 4 and 5, the tab film 356 may be formed by inserting the negative electrode lead 352 and the positive electrode lead 354 between two films having a predetermined width and length, respectively, and then fusion-bonding the two films, thereby connecting the negative electrode lead 352 and the positive electrode lead 354 as one body. In an implementation, on the basis of a state in which the pair of tab films 356 are fused, one end of the tab film 356 may be attached to the negative electrode lead 352 and the other end thereof may be attached to the positive electrode lead 354. In addition, the tab film 356 may be configured such that a portion thereof between the negative electrode lead 352 and the positive electrode lead 354 may be cut, which will be described below. The sealing portion 334 of the pouch 330 may be positioned and sealed corresponding to the position of the tab film 356. The tab film 356 may be be fused together with the pouch 330 when the pouch 330 is sealed, and may be made of the same material as a surface of the pouch 330 in contact with the tab film 356.

Hereinafter, the sealing portion of the tab film 356 and the pouch 330 will be described in more detail.

FIGS. 6 to 9 are schematic diagrams showing the sealing structures of strip terminals according to first to fourth embodiments of the present disclosure.

Figure 6:
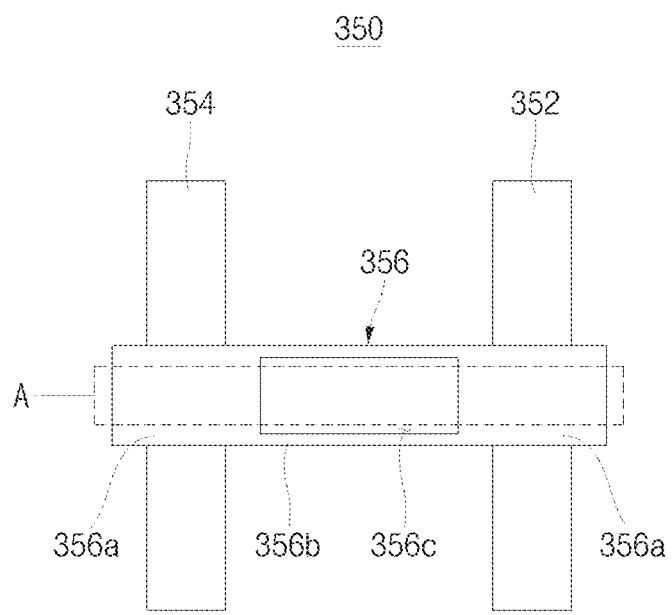
FIGS. 6 to 9 are schematic diagrams showing the sealing structures of strip terminals according to first to fourth embodiments of the present disclosure.

As shown in FIG. 6, the tab film 356 according to the first embodiment of the present disclosure may be fixed in a state in which a pair of rectangular films are overlapped, and the negative electrode lead 352 and the positive electrode lead 354 are inserted therebetween. For convenience, one end and the other end of the tab film 356 into which the negative electrode lead 352 and the positive electrode lead 354 are inserted are defined as tab support portions 356a. In addition, a portion between the tab support portions 356a (of both ends of the tab film 356) may be defined as a tab connection portion 356b. In the tab film 356 according to the first embodiment, a rectangular through-hole 356c may pass through the tab connection portion 356b.

The through-hole 356c may be configured such that all parts except for the minimum area are cut so as to help prevent the tab connection portion 356b from being broken. In an implementation, the tab connection portion 356b may be configured such that a film is left in a rectangular shape along the longitudinal direction of the tab film 356. Formation of the through-hole 356c may be achieved by using a processing method such as punching processing or laser processing after forming the rectangular tab film 356. After the processing or forming of the through-hole 356c is completed, the tab support portions 356a may be attached to the negative electrode lead 352 and the positive electrode lead 354. In an implementation, the tab support portions 356a may first be attached to the negative electrode lead 352 and the positive electrode lead 354, and the through-hole 356c may then be processed. The through-hole 356c may be formed while the tab connection portion 356b is not broken and the shape is maintained, and the amount of resin of the tab connection portion 356b may be slightly increased compared to the separation type structure of the tab film 356 shown in FIG. 2. Compared to the integrated structure of the tab film 356 shown in FIG. 3, the amount of resin of the tab connection portion 356b may be greatly reduced. Therefore, the tab film 356 according to the first embodiment of the present disclosure may have an effect of reducing the amount of resin while maintaining the workability of the integrated structure of the tab film 356 shown in FIG. 3 as it is.

In addition, the size of the tab film 356 may vary depending on the sizes of the negative electrode lead 352 and the positive electrode lead 354, and a distance between the negative electrode lead 352 and the positive electrode lead 354, and thus a length and width of the through-hole 356c and a sealing width may also vary depending on the distance between and the sizes of the negative electrode lead 352 and the positive electrode lead 354. In a state in which the tab film 356 is attached to the negative electrode lead 352 and the positive electrode lead 354, as shown in FIG. 5, the tab film 356 may be disposed so as to match or be aligned with the sealing portion of the pouch 330. In an implementation, a sealing width of the tab film 356 thermally fused together when the pouch 330 is sealed may be, e.g., 0.5 mm, with respect to the width of the through-hole 356c.

When the width of the through-hole 356c is smaller than the sealing width, in view of a cross-section in the width direction of the sealing width, a region having the tab film 356 may exist. The through-hole 356c may be processed while leaving only a minimum amount of the tab connection portion 356b, and the amount of resin added may be slightly increased compared to the structure of the separation type tab film 356 shown in FIG. 2 and thus may not affect the entire sealing width direction.

When the width of the through-hole 356c is greater than the sealing width, in view of a cross-section in the width direction of the sealing width, a region having the tab film 356 may not exist. Therefore, like the structure of the separation type tab film 356 shown in FIG. 2, the amount of resin may not affect the sealing width direction.

One reason for an increase in the amount of moisture having infiltrated into the sealing portion may be that the resin (e.g., the integrated tab film 356 shown in FIG. 2) exists or is present between a pair of tabs. For example, a sealing area (2 to 3 mm wide) sealed by thermal fusion may be a thinnest portion in the thermally fusible resin, and if the tab film 356 were to be present in this area, a resin balance may be adjusted during sealing, making it difficult to optimize the sealing conditions. Using a method of pushing the tab film 356 with heat makes it possible to make the same resin thickness as before. In this regard, the flow rate of resin may be increased, and a load may be applied to the interface between a resin (tab film) and a metal (tab) and delamination may more likely to occur. In addition, if the resin of the tab film 356 were to flow outwardly too much, the shape of the tab film 356 could be distorted and an appearance defect may occur. In addition to the amount of moisture infiltration, the sealing strength could be lowered due to the presence of the tab connection portion 356b.

Therefore, as in the first embodiment of the present disclosure, by preventing the tab film 356 from being present (e.g., by including the through-hole) in the sealing portion (the dotted line portion in FIG. 6), the same moisture infiltration amount, resin thickness, and sealing properties as those of the structure to which the separation type tab film 356 shown in FIG. 3 is applied may be obtained. In addition, the same process advantages as those of the structure to which the integrated tab film 356 shown in FIG. 2 is applied may be maintained. In an implementation, by including the through-hole 356c in the tab connection portion 356b, a strip terminal utilizing or exhibiting the advantages of both of the integrated and separation type tab films may be provided.

In the above-described tab film 356 according to the first embodiment of the present disclosure, the through-hole 356c may have a rectangular shape, or may be formed to have another shape (Detailed description of the same features with the above-described embodiment will be omitted).

Figure 7:
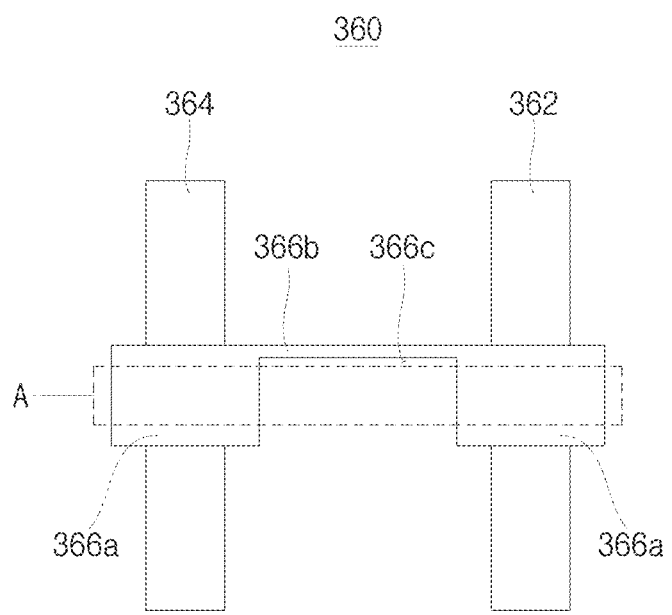

As shown in FIG. 7, a tab film 366 according to a second embodiment of the present disclosure may include a through-hole 366c having a rectangular shape in which one side in the longitudinal direction of a tab connection portion 366b is opened. In an implementation, the tab film 366 may be configured such that the tab connection portion 366b remains only at the top portion in FIG. 7 to connect the tab support portions 366a.

Figure 8:
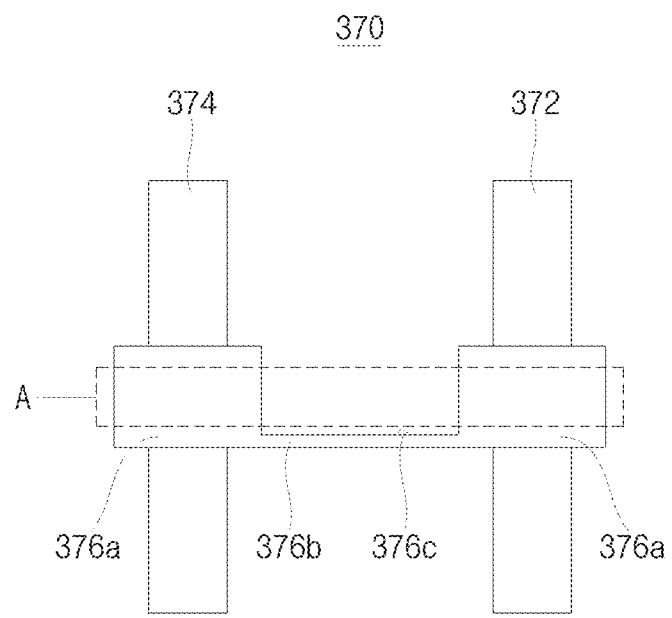

In an implementation, as shown in FIG. 8, a tab film 376 according to a third embodiment of the present disclosure may be configured such that a through-hole 376c opened in a direction opposite to that of the tab film 366 according to the second embodiment is formed. In an implementation, the tab film 376 may be configured such that the tab connection portion 376b remains only at the bottom portion in FIG. 8 to connect the tab support portions 376a.

Like the tab film 356 according to the first embodiment, the tab films 366 and 376 according to the second and third embodiments may also help minimize the amount of resin added, thereby improving the moisture infiltration prevention, resin thickness, and sealing properties, compared to an integrated tab film 150', while maintaining the advantages of the manufacturing process.

Figure 9:
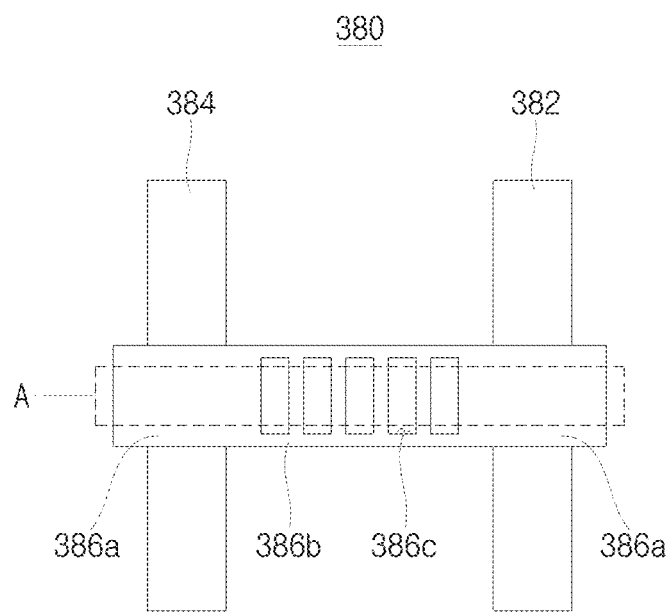

As shown in FIG. 9, a tab film 386 according to a fourth embodiment may include a plurality of rectangular through-holes 386c spaced apart along the longitudinal direction of tab connection portions 386b. Like the tab film 356 according to the first embodiment, the tab film 386 according to the fourth embodiment may also help minimize the amount of resin added resin, thereby improving the moisture infiltration prevention, resin thickness, and sealing properties while maintaining the advantages of the manufacturing process, compared to the integrated tab film 150'.

In an implementation, the through-hole may have, e.g., a circular shape, an oval shape, a triangle shape, or a polygonal shape. In an implementation, the through-hole may be in the form of a plurality of dotted lines, a straight line, a curved shape, a mixed shape of a straight line and a curved line, an X shape, or the like, along the longitudinal direction of the tab connection portion.

In an implementation, Al, Cu, Ni, Cu—Ni Clad material, or the like may be applied as the material of the conductor (lead) constituting the negative electrode tab and the positive electrode tab.

In an implementation, e.g., a PP (polypropylene) resin may be applied as the material of the tab film.

In an implementation, e.g., Nylon/AL/CPP may be applied as the material of the pouch.

Hereinafter, an example in which the sealing structures according to the embodiments of the present disclosure will be described in comparison with the sealing structure of other secondary batteries.

FIG. 10 shows a table comparing breaking conditions during thermal exposure tests in the sealing structure of a secondary battery and the sealing structure of a secondary battery according to embodiments of the present disclosure. The test conditions of FIG. 10 were that the width of the tab film (the vertical direction shown in FIG. 10 is the width direction) was 6 mm, and the distance between the negative electrode lead and the positive electrode lead was 14 mm (the horizontal direction in view of the drawing shown in FIG. 10). In addition, the heat exposure conditions were that the temperature reached was 134° C. and the temperature increase rate was 5° C./min.

As shown in FIG. 10, in the case of a separation type strip terminal, the size of a punching area corresponding to a through-hole (a space between tab films) was 4 mm in width and 12 mm in length. It may be seen that the separation type strip terminal was broken at 385 mbar at 132.3° C. (Comparative Example 0 of FIG. 10).

In the case of an integrated strip terminal without a through-hole (Comparative Example 1 of FIG. 10), it may be seen that the integral strip terminal broke at a lower temperature and lower breaking pressure than the separation type strip terminal.

In Examples 2 and 3 of FIG. 10, among embodiments of the present disclosure, it may be seen that the size of the punching area was the same as or similar to that of the separation type strip terminal, and the breakage temperature and pressure were higher than that of the separation type strip terminal. This indicates that the strip terminals according to Examples 2 and 3 of FIG. 10 had higher breaking strength than the separation type strip terminal.

In addition, in Example 4 of FIG. 10, among embodiments of the present disclosure, the strip terminal according to Example 4 had lower breaking temperature and breaking pressure than the strip terminal according to Example 0, but had higher breaking temperature and breaking pressure than the integrated strip terminal according to Example 1. That is, it may be seen that, although the size of the punching area was relatively small, the strip terminal according to Example 4 had a higher breaking strength than the integrated strip terminal without a punching area.

As described above with respect to the thermal exposure tests, the strip terminal according to embodiments may help maintain the same strength level as that of the separation type strip terminal while maintaining the workability and productivity of the integrated strip terminal.

By way of summation and review, a small amount of moisture could infiltrate into the thermally fusible resin layers to then enter the case. In such a case, the moisture could react with the electrolyte to increase resistance and may generate a gas that lowers battery capacity, resulting in a dimensional change caused to the secondary battery due to expansion of the secondary battery, thereby ultimately lowering the stability and performance of the secondary battery.

One or more embodiments may provide a secondary battery capable of minimizing moisture having penetrated into a pouch and improving sealing reliability.

According to an embodiment, the amount of moisture having infiltrated into the secondary battery may be significantly reduced. In addition, according to the embodiment, the sealing force may be maintained without compromising sealing reliability, such as the laminate strength of a pouch.

One or more embodiments may provide a polymer secondary battery having an improved sealing structure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly including a negative electrode plate having a negative electrode tab, a positive electrode plate having a positive electrode tab, and a separator between the negative electrode plate and the positive electrode plate;
a pouch accommodating the electrode assembly, the pouch having a top sealing portion and a bottom sealing portion at an edge thereof that are sealed with the electrode assembly accommodated in the pouch; and
a strip terminal, including:
a negative electrode lead electrically connected to the negative electrode tab,
a positive electrode lead electrically connected to the positive electrode tab, and
a tab film having one end coupled to the negative electrode lead and another end coupled to the positive electrode lead, the tab film insulating the negative electrode lead, the positive electrode lead, and the pouch from one another and including at least one through-hole passing therethrough between the one end and the other end,
wherein the at least one through-hole:
extends along a longitudinal direction of the tab film, and
has a circular shape, an oval shape, a polygonal shape, a straight shape, a curved shape, or a dotted line shape entirely contained within edges of the tab film or has a polygonal shape extending all the way to an inner one of the edges of the tab film such that the polygonal-shaped through-hole is open towards the pouch, and
wherein the at least one through-hole is completely sealed by the top sealing portion and the bottom sealing portion of the pouch such that the top sealing portion directly contacts the bottom sealing portion through the at least one through-hole.

2. The secondary battery as claimed in claim 1, wherein a portion of the top sealing portion and the bottom sealing portion overlies the at least one through-hole of the tab film.

3. The secondary battery as claimed in claim 2, wherein the portion of the top sealing portion and the bottom sealing portion is aligned along the longitudinal direction of the tab film.

4. The secondary battery as claimed in claim 1, wherein the tab film is in the form of two sheets, which are attached to each other with the negative electrode lead and the positive electrode lead therebetween.

5. The secondary battery as claimed in claim 3, wherein:
the tab film has a rectangular shape,
the tab film includes:
tab support portions coupled to the negative electrode lead and the positive electrode lead, and
a tab connection portion connecting the tab support portions, and the at least one through-hole is in the tab connection portion.

6. A secondary battery, comprising:
an electrode assembly including a negative electrode plate having a negative electrode tab, a positive electrode plate having a positive electrode tab, and a separator between the negative electrode plate and the positive electrode plate;
a pouch accommodating the electrode assembly, the pouch having a top sealing portion and a bottom sealing portion at an edge thereof and sealed in a state in which the electrode assembly is accommodated therein; and
a strip terminal, including:
a negative electrode lead electrically connected to the negative electrode tab,
a positive electrode lead electrically connected to the positive electrode tab,
tab support portions coupled to the negative electrode lead and the positive electrode lead, and
a tab connection portion connecting the tab support portions, the tab connection portion including a tab film having at least one through-hole passing through a partial area of the tab connection portion,
wherein the at least one through-hole of the tab film:
is on the sealing portion of the pouch,
extends along a longitudinal direction of the tab film, and
has a circular shape, an oval shape, a polygonal shape, a straight shape, a curved shape, or a dotted line shape entirely contained within edges of the tab film or has a polygonal shape extending all the way to an inner one of the edges of the tab film such that the polygonal-shaped through-hole is open towards the pouch, and
wherein the at least one through-hole is completely sealed by the top sealing portion and the bottom sealing portion of the pouch such that the top sealing portion directly contacts the bottom sealing portion through the at least one through-hole.

7. The secondary battery as claimed in claim 6, wherein a portion of the top sealing portion and the bottom sealing portion overlies the at least one through-hole of the tab film.

8. The secondary battery as claimed in claim 6, wherein the tab film is in the form of two sheets, which are attached to each other with the negative electrode lead and the positive electrode lead therebetween.

9. A secondary battery, comprising:
an electrode assembly including a negative electrode plate having a negative electrode tab, a positive electrode plate having a positive electrode tab, and a separator between the negative electrode plate and the positive electrode plate;
a pouch accommodating the electrode assembly, the pouch having a top sealing portion and a bottom sealing portion at an edge thereof that are sealed with the electrode assembly accommodated in the pouch; and
a strip terminal, including:
a negative electrode lead electrically connected to the negative electrode tab,
a positive electrode lead electrically connected to the positive electrode tab, and
a tab film having one end coupled to the negative electrode lead and another end coupled to the positive electrode lead, the tab film insulating the negative electrode lead, the positive electrode lead, and the pouch from one another and including at least one through-hole passing therethrough between the one end and the other end,
wherein the top sealing portion and the bottom sealing portion of the pouch are completely sealed through the at least one through-hole such that the top sealing portion directly contacts the bottom sealing portion through the at least one through-hole.

\* \* \* \* \*